United States Patent [19]
Kluft

[11] Patent Number: 5,824,917
[45] Date of Patent: Oct. 20, 1998

[54] FORCE MEASURING DEVICE

[76] Inventor: Werner Kluft, Ellerstrasse 43, Aachen, Germany, 52078

[21] Appl. No.: 615,312
[22] PCT Filed: Sep. 13, 1994
[86] PCT No.: PCT/EP94/03056
§ 371 Date: Mar. 14, 1996
§ 102(e) Date: Mar. 14, 1996
[87] PCT Pub. No.: WO95/08102
PCT Pub. Date: Mar. 23, 1995

[30] Foreign Application Priority Data

Sep. 14, 1993 [DE] Germany ............ P 43 31 104.0
Sep. 15, 1993 [DE] Germany ............ P 43 31 405.8

[51] Int. Cl.⁶ ...................................................... G01L 1/04
[52] U.S. Cl. .............................. 73/862.636; 73/862.625; 73/862.637; 73/DIG. 4
[58] Field of Search ................. 73/862.625, 862.629, 73/862.632, 862.633, 862.636, 862.637, 862.68, DIG. 4

[56] References Cited

U.S. PATENT DOCUMENTS

| | | | |
|---|---|---|---|
| 3,410,135 | 11/1968 | Reynaud | 73/862.636 |
| 4,744,254 | 5/1988 | Barten | 73/862.637 X |
| 4,770,050 | 9/1988 | Hafner et al. | 73/862.636 X |
| 4,827,240 | 5/1989 | Hafner | 73/862.636 X |
| 5,029,483 | 7/1991 | Gautschi et al. | 73/862.68 X |

*Primary Examiner*—Elizabeth L. Dougherty
*Attorney, Agent, or Firm*—Knechtel, Demeur & Samlan

[57] ABSTRACT

A force measuring device for measuring forces between mutually parallel machine parts, preferably in force bypass. The device has two mutually parallel abutment faces (5,6) having an adjustable distance between them. A force sensor (18) is integrated in a first measuring wedge (1), with a first measuring face projecting beyond the measuring wedge (1) and forming the first abutment face (5). On the side opposite the abutment face (5) is a first force-transmitting inclined slide face (15). A second measuring wedge (3) comprises a second force-transmitting slide face (16) being parallel to the first slide face (15). On the side opposite the second slide face (15) is the second abutment face (6) being parallel to the first abutment face (5). The measuring wedges (1,3) can slide relative to each other on the slide faces (15,16) thereby causing the abutment faces (5,6) to move parallel to each other. The wedges (1,3) are connected to each other by an adjustment device (7,8).

9 Claims, 2 Drawing Sheets

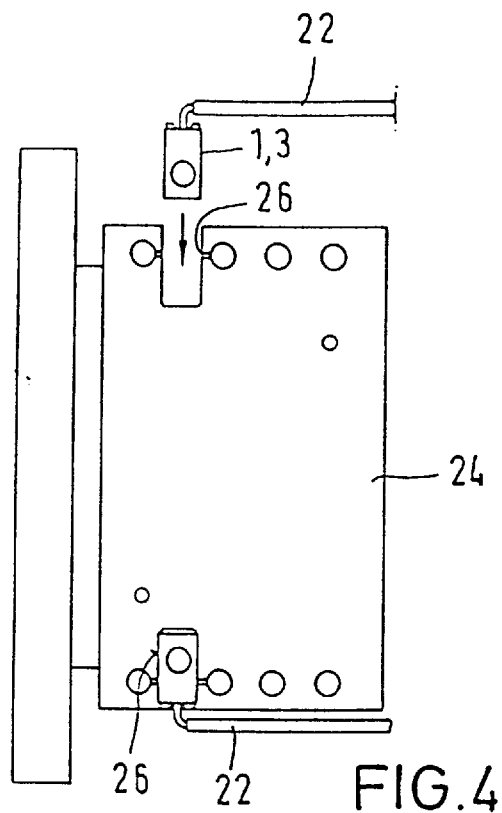
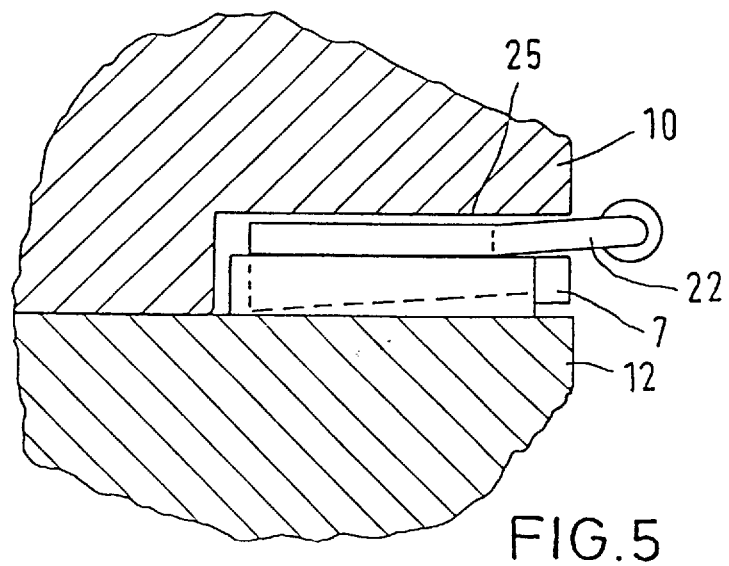

FORCE MEASURING DEVICE

FIELD OF THE INVENTION

The invention relates to a force measuring device comprising a force sensor for measuring forces between mutually parallel machine parts, preferably in force bypass, in which the force measuring device has two parallel abutment faces having an adjustable distance between them.

DESCRIPTION OF THE PRIOR ART

Force measuring devices of the above type are used for the measurement of forces in machines, particularly machine tools, and preferably in force bypass. Measurement in force bypass is known from CH-PS 476 990 and DE 27 36 373 A1. If the measurement is performed in force bypass, the force sensor need measure only part of the generated forces so that the measurement range can be considerably widened.

Known from EP 0 433 535 A are force measuring devices which comprise at least one force sensor and, to perform measurement in force bypass, are clamped in pocket-sized recesses between two machine parts. For this purpose, it is known to provide the force measuring device with pairs of wedges which make it possible to install the force measuring device while providing with a bias. However, known measuring devices have such a constructional height that they cannot be mounted in partition plates having a thickness of 12 mm, since the pair of wedges together with the measuring element has a thickness of about 16 mm. On the other hand, the commonly used partition plates or respectively force measuring plates have a thickness of 12 mm. Such partition plates are installed, e.g., between the tool revolver and the tool carriage in turning machines so as to perform tool or process monitoring. To receive the force measuring device, the partition plates have corresponding recesses formed therein. Further, known force measuring devices disadvantageously consist of a plurality of constructional parts so that they are mounted with difficulties. Some of the known force measuring devices have to be fastened to the machine parts or be supported against them to allow the setting of the bias force. Also this is undesired with regard to a straightforward mounting process.

SUMMARY OF THE INVENTION

It is the object of the invention to provide a force measuring device which has a reduced constructional height, can be mounted in an easier manner and is suited for a larger variety of uses.

The invention advantageously provides that the force sensor in a first measuring wedge is integrated in a recess in such a manner that the force sensor projects beyond the first measuring wedge, together with a first measuring surface forms a first abutment face, and with the second measuring surface, being parallel to the first measuring surface, is supported in the recess, that the first measuring wedge on the side opposite to the abutment face comprises a first force-transmitting inclined slide face, that a second flat measuring wedge comprises a second force-transmitting slide face being parallel to the first slide face and on the side opposite the second slide face comprises a second abutment face being parallel to the first abutment face, and that the measuring wedges are in parallel displaceable relative to each other on the abutment faces by use of an adjustment device and are connected to each other via said adjustment device.

Such a construction allows for a space-saving arrangement since the first measuring wedge need not be substantially higher than the force sensor, while the second measuring wedge can have a flat configuration. A further considerable advantage resides in that the force measuring device is arranged in one piece. Thereby, the mounting process can be performed in a very convenient manner and also can be easily performed subsequently. The inventive construction allows for a total height of the force measuring device which is not substantially larger than the minimum height determined by the force sensor. Thus, it is possible to produce force measuring devices having a constructional height of 12 mm, which can be used also in standardized partition plates to carry out force measurement between two machine parts.

Preferably, it is provided that the second measuring wedge accommodates the first measuring wedge in a recess which is delimited by at least two side walls. Thus, the slide face of the second measuring wedge can be extended until merging into the second abutment face of the second measuring wedge. In this regard, the side walls serve for increasing the stability so that the second slide face at its tapered free end is protected against damage. A laterally stiffened slide face of this type allows for a reduction of the minimal wall thickness and thus of the constructional height of the force measuring device.

The adjustment device is preferably arranged in a transverse wall extending orthogonally to the side walls, and is most preferably arranged at the higher end of the second slide face. The adjustment device makes it possible to set a bias between the abutment faces 5,6 in a pocket-shaped recess between two mutually parallel machine parts, while it is not required that elements of the adjustment device be supported against the machine parts 10,12.

The angle of inclination of the slide faces is about 3° to 9°, preferably about 6°.

The insertion of the measuring wedge into a recess delimited by two side walls and at least one transverse wall offers the advantage that, in spite of the reduced dimensions of the constructional element, there is provided a stable and stiff force measuring device which can be loaded to a large extent.

An embodiment of the invention will be explained in greater detail hereunder with reference to the drawings.

BRIEF DESCRIPTION OF THE DRAWINGS

FIG. 4 illustrates the mounting of the force measuring device into a partition plate, and FIG. 5 is a view of a force measuring device clamped between two machine parts in a recess.

DESCRIPTION OF THE PREFERRED EMBODIMENT

Figure 1:
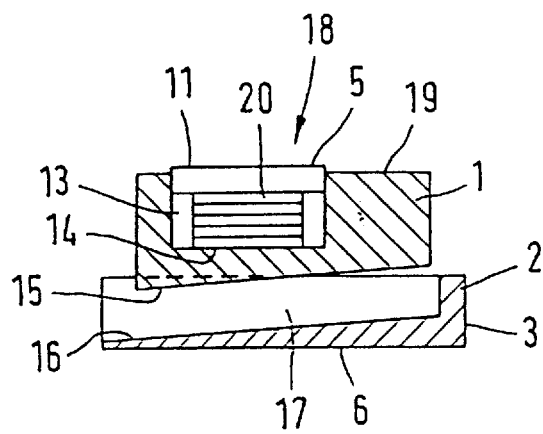
FIG. 1 shows a cross sectional view of a force measuring device according to the invention.

The force measuring device substantially consists of two cooperating measuring wedges 1,3, an adjustment device allowing a parallel displacement 9 of the measuring wedges 1,3 relative to each other, and a force sensor 18 which in the first measuring wedge is integrated in a recess 13. The recess accommodating the force sensor is arranged in the higher portion of measuring wedge 1, and the force sensor 18 with a first measuring face 11 projects beyond the measuring wedge 1 and with its measuring face 11 forms a first abutment face 5 of the force measuring device. The force sensor 18 is supported on its side opposite the measuring face 11 by a second measuring surface 14. Support for this addition is found in FIG. 1 and claim 3. In its unloaded condition, the force sensor 18 projects beyond the upper face 19 of measuring wedge 1 parallel to abutment face 5 to an extent corresponding to the maximum admissible compression, thus also providing an overload safety device for the force sensor 18. The abutment face 5 extends in parallel to the surfaces of mutually parallel machine parts 10,12 between which the force is to be measured. The constructional height of the measuring wedge 1 need not be substantially larger than the constructional height of the force sensor 18. Therefore, the measuring wedge 1 shown in FIG. 1 could still be reduced in size to such an extent that the inclination of the slide face 15 on the underside of measuring wedge 1 extends to a position close to the recess 13 for the force sensor 18.

Figure 2:
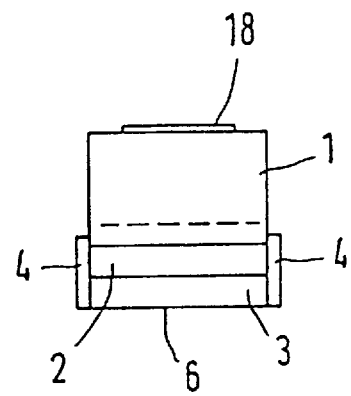
FIG. 2 shows a view of the rear end face of the force measuring device.
Figure 3:
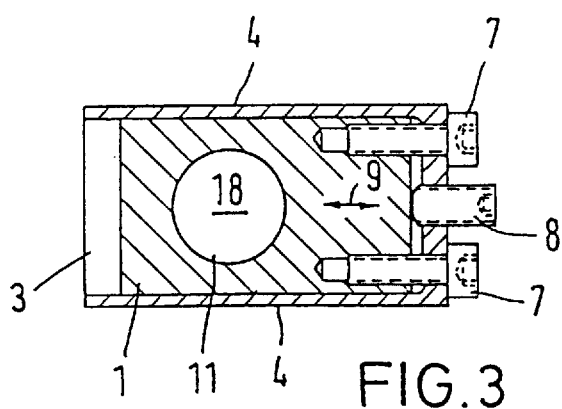
FIG. 3 shows a plan view of the force measuring device of FIG. 1.

In FIGS. 1 and 2, the force measuring device is illustrated in the disassembled state.

According to FIG. 2, however, the upper measuring wedge 1 is fixedly connected to the lower measuring wedge 3 through the adjustment device 7,8, so that the parts cannot fall apart during the mounting process. The lower measuring wedge 3 comprises a recess, delimited by a transverse wall 2 and two mutually parallel side walls 4, which slideably receives the upper measuring wedge 1 on a lower slide face 16 of lower measuring wedge 3 being parallel to the first slide face 15 of upper measuring wedge 1.

The angle of inclination of the mutually parallel slide faces 15,16 is about 3° to 9°, preferably about 6°.

The adjustment device comprises at least one clamping screw 7 and a release or respectively press-on screw 8 which is guided through the transverse wall 2 in parallel to the moving direction 9 of measuring wedge 1. By use of the adjustment device, the upper measuring wedge 1 can be displaced on the force-transmitting slide faces 15,16 in the moving direction 9 parallel to the side walls 4, whereby the distance between the abutment faces 5 and 6 is changed and a predetermined bias force between the machine parts 10,12 can be set.

The lower abutment face 6 of second measuring wedge 3, arranged in parallel to the abutment face 5 of force sensor 18, is supported on the machine part 12. On the end opposite to transverse wall 2, the slide face of lower measuring wedge 3 can be guided nearly to the lower abutment face 6 because the side walls 4 lend sufficient stability to lower measuring wedge 3.

The cable connection 22 for the force sensor 18 is preferably led to the outside on one of the short end sides of upper measuring wedge 1. The force sensor 18 can comprise a one-, two- or three-dimensional force measuring element.

Using a 3D quartz measuring element, quasi-static and dynamic tension measurements and respectively compression measurements can be performed in structures of machine parts or devices according the force bypass measuring principle.

FIG. 4 illustrates the mounting of the force measuring device in a partition plate 24 having recesses 26 formed therein with upper and lower openings.

FIG. 5 illustrates the mounting of the force measuring device in a pocket-shaped recess 25 between two machine components 10,12.

I claim:

1. A force measuring device comprising a force sensor (18) for measuring forces between mutually parallel machine parts (10,12), preferably in force bypass, comprising:

two mutually parallel abutment faces (5,6), the orthogonal distance of said abutment faces being adjustable, a first measuring wedge (1) in which the force sensor is mounted, a second measuring wedge (3) on which the first measuring wedge (1) is placed, each measuring wedge (1,3) having mutually parallel, mutually confronting slide faces (15,16) arranged at an inclination to the abutment faces (5,6) for permitting parallel displacement of the first and second abutment faces (5,6) with respect to each other, and an adjustment means (7,8) for connecting the measuring wedges (1,3) to each other for displacing the first measuring wedge (1) relative to the second measuring wedge (3) to set the distance between the abutment faces (5,6).

2. The force measuring device according to claim 1, wherein the force sensor (18) in the first measuring wedge (1) is arranged in a region of the larger height within a recess (13).

3. The force measuring device of claim 1 wherein the two mutually parallel abutment faces (5,6) are comprised of a first abutment face (5) on the first measuring wedge (1) and a second abutment face (6) on the second measuring edge (3).

4. The force measuring device according to claim 1, 2, or 3 and further comprising a first measuring face (11) on the force sensor (18) projecting beyond the first measuring wedge (1) and forming the first abutment face (5), the sensor 18 being supported in the measuring wedge 1 on a second measuring surface (14), which is parallel to the first measuring face 11.

5. The force measuring device according to claim 4, wherein the second measuring wedge 3 receives the first measuring wedge (1) in a recess (17) which is delimited by two side walls (4) extending laterally of the slide faces (15,16).

6. The force measuring device according to claim 5 wherein the recess (17) in the second measuring wedge (3) is further delimited by a transverse wall (2) through which the adjustment device (7,8) passes to restrict movement of the first measurement wedge (1) from passing beyond said transverse wall (2).

7. The force measuring device according to claim 5 wherein the force sensor (18) comprises a plurality of piezoelectric integrated quartz plates (20) which allow a force measurement in one, two or three directions oriented orthogonally to each other.

8. The force measuring device according to any one of claim 5 wherein the angle of inclination of the slide faces (15,16) relative to the abutment faces (5,6) is about 3° to 9°, preferably about 6°.

9. The force measuring device according to claim 5 and further comprising a connection cable (22) with one end connected to the force sensor (18) and the other end leading out from the upper measuring wedge (1).

* * * * *